United States Patent [19]

Manasse

[11] Patent Number: 5,345,578
[45] Date of Patent: Sep. 6, 1994

[54] COMPETITIVE SNOOPY CACHING FOR LARGE-SCALE MULTIPROCESSORS

[75] Inventor: Mark S. Manasse, San Mateo County, Calif.

[73] Assignee: Digital Equipment Corporation, Maynard, Mass.

[21] Appl. No.: 34,178

[22] Filed: Mar. 19, 1993

Related U.S. Application Data

[63] Continuation of Ser. No. 375,199, Jun. 30, 1989, abandoned.

[51] Int. Cl.⁵ ............................................. G06F 15/16
[52] U.S. Cl. ..................... 395/425; 364/DIG. 1; 364/230.6; 364/931.5; 364/964.2; 395/500; 395/800
[58] Field of Search ... 364/200 MS File, 900 MS File; 395/400 MS, 425 MS

[56] References Cited

U.S. PATENT DOCUMENTS

| | | | |
|---|---|---|---|
| 4,667,308 | 5/1987 | Hayes et al. | 364/900 |
| 4,709,327 | 11/1987 | Hillis et al. | 364/200 |
| 4,766,534 | 8/1988 | Debenedictis | 364/200 |
| 4,805,091 | 2/1989 | Thiel et al. | 364/200 |
| 4,811,214 | 3/1989 | Nosenchuck et al. | 364/200 |
| 4,814,973 | 3/1989 | Hillis | 364/200 |
| 4,814,980 | 3/1989 | Peterson et al. | 364/200 |
| 5,170,482 | 12/1992 | Shu et al. | 395/800 |

*Primary Examiner*—Joseph L. Dixon
*Assistant Examiner*—Reba I. Elmore
*Attorney, Agent, or Firm*—Richard J. Paciulan; Denis G. Maloney

[57] ABSTRACT

A system and method of satisfying read and write requests is used in a system having a plurality of cache-equipped processors coupled into a hypercube structure via buses, where each processor is simultaneously coupled to other processors on other buses via gateway means. Read and write requests for a line of data from any of the processors are satisfied by forwarding an update or invalidate request for a given data block containing the line of data requested. This request is forwarded to all other buses on which the block is present. The present invention provides for responding to a read request for a line of data from a processor by forwarding the request, and resultant data, to one of the buses on which the block is stored, where each gateway responds to the request to forward the request along exactly one branch.

6 Claims, 4 Drawing Sheets

COMPETITIVE SNOOPY CACHING FOR LARGE-SCALE MULTIPROCESSORS

This is a continuation of application Ser. No. 07/375,199 filed Jun. 30, 1989 now abandoned.

BACKGROUND OF THE INVENTION

Snoopy caching has proven itself to be useful in building practical small-scale multiprocessors, such as Sequent's Balance 8000 (Fielland et al., (January 1984) "32-bit computer system shares load equally among up to 12 processors," *Electron. Design*, 153–168) and DEC's Firefly. Current designs for large-scale multiprocessors, such as BBN's Butterfly, NYU's Ultracomputer, Thinking Machines' Connection Machine, and IBM's RP3, are generally more restrictive than snoopy-cache machines. For instance, they may require all machines to execute the same instruction at the same time, or to issue memory requests synchronously, or to limit the performance of each processor to the switching delay of the network connecting the processors to memory. In each case, the restrictions imposed are due to the failure of the machine to present an efficient implementation of a shared-memory abstraction. Snoopy caching does, typically, present such an efficient implementation, because most programs exhibit sufficient locality of reference that local caches can satisfy most memory requests (Archibald et al. (November 1986) "Cache coherence protocols: evaluation using a multiprocessor simulation model," *A CM Transactions on Computer Systems*, 4:273–298; Frank (January 1984) "Tightly coupled multiprocessor system speed memory access times" *Electronics* 57:164–169; Goodman (July 1983) "Using cache memory to reduce processor-memory traffic," *Proc. 10th Annual IEEE Intntl. Symposium on Computer Architecture*, Stockholm 124–131; Katz et al. (July 1985) "Implementing a cache consistency protocol," *Proc. 12'th Annual IEEE Intntl. Symposium on Computer Architecture*, 276–283; and Vernon et al. (May 1986) "Performance analysis of multiprocessor cache consistency protocols using generalized timed Petri nets," *Proc. of Performance '86 ACM/SIGMETRICS Conf. on Computer Performance Modelling and Evaluation*, 11'th IFIP Working Group 7.3 intntl. symposium, NCSU).

Snoopy caching has its problems for large-scale multiprocessing. Foremost among these is the restricted memory bandwidth available on a single bus.

Thus, a problem to be addressed by this invention is establishing techniques for enhancing the available bandwidth to memory, by extending snoopy caching to networks of buses. Snoopy caching on a tree of buses is quite simple; unfortunately, most bus cycles in a snoopy cache go towards servicing read misses from main memory. Since the only path to memory is at the root of the tree, congestion at the root limits the size of the system. Therefore, a problem addressed herein is to extend snoopy caching to hypercubes of buses.

Another problem with existing snoopy algorithms is that they often use the bus quite badly. That is, the algorithm which maintains consistency will use many more bus cycles than are necessary. The problem here is to compare algorithms with the optimal algorithm, which knows the entire pattern of requests in advance. If this seems overly generous, just think of it as an algorithm that only knows the past, and which guesses the next few operations, and happens to be right. By using the bus more efficiently, the overall load on the network of buses is reduced, allowing addition of more processors.

Existing algorithms waste bus cycles in a number of ways. First, compare the exclusive-write protocol used in the Balance machine with optimal behavior. If a location that is actively shared is written to, the entire cache line is invalidated at low cost. But, since the location is actively shared, as each processor reads the location, the line must be read back into each cache at high cost. This will happen quite often in programs that have heavy contention for a block that is held briefly, for example. This request sequence could be handled much more cheaply by updating the other caches on each write.

On the other hand, consider the pack-rat protocol used in the Firefly. If a location was shared at some point in the past, but is now active in only one processor, updates to that location must still be transmitted to other caches, until the other cache takes a collision on the cache line containing this location. In the limiting case, if the caches are as large as the virtual address space (not wholly improbable, since the caches serve primarily to reduce main memory contention), eventually every location is shared, and all updates are write-through. This happens as soon as a thread moves from one processor to another. For this request sequence, the optimal response is to invalidate the line in all other caches as soon as the first write comes along.

In contrast to these algorithms, techniques presented herein achieve results which are always within a small constant factor of optimal. Such algorithms are called competitive. In order to be competitive, an algorithm must adapt to the situation so that, in the long run, it gets to the same state that the optimal algorithm uses. Unlike the optimal algorithm, it must hedge its bets, abandoning decisions when, and only when, those decisions become hopeless.

Algorithms that use invalidation also waste bus cycles by ignoring the broadcast capabilities of a bus when reading back previously invalidated blocks. The algorithm presented herein takes advantage of this to respond more quickly to changes in usage patterns.

SUMMARY OF THE INVENTION

This new method provides the performance advantages of cached local memory, and enough bandwidth to main memory, with a large number of processors.

The major features of this invention are:

1. Serializability can be preserved with only a small multiplicative constant increase in communication complexity.

2. Cache sizes also need to be increased by only a small multiplicative constant over their size in a single-bus snoopy cache.

The overall structure makes use of a high-bandwidth network of buses. In this arrangement, the connections form a grid, and the number of paths to memory is $n^{1-1/d}$, where n is the number of processing elements, and d is the dimension of the hypercube. This leads to a solution which is quite good for updates in which serialization requirements are lax, and which is the best possible when serialization is important. For each memory block, we allocate the address bits for that block to determine a spanning tree of the network. We then solve the problems of serialization of operations on different spanning trees, and the problem of efficiently maintaining coherency within a spanning tree.

Although this method is not limited to any particular organization of buses, an example network is a d-dimensional n-cube, with buses for edges. That is, the caches have addresses which are d-tuples of integers between 1 and n. The buses have addresses which are d-tuples that have one entry which is a '*' and all other entries which are integers between 1 and n. A bus connects all the caches whose address agrees with the address in all positions other than the one with the '*'. We say that a bus is parallel to dimension i if the i'th entry in its address is the '*'. We place a main memory module at position 0 for every bus parallel to dimension 1. Thus, the address of a memory is a d-tuple of integers, the first of which is a 0, and the remainder of which are between 1 and n. If n is chosen to be a power of two, we can easily define a hash function from block addresses to d-1 tuples of integers between 1 and n, since we can just take any (d-1)*log(n) bits from the address, and permute them into d-1 groups of log(n) bits. Given such a hash function, the main memory module associated with a block is the one whose address is a 0 concatenated with the result of the hash function on the address of the block. We construct a spanning tree for that memory module by including the unique bus parallel to dimension 1 which connects to that memory module, and by taking all buses parallel to dimension i+1 which connect to a processor connected to a bus parallel to dimension i which is already in the tree.

The protocol used within a spanning tree works as follows: There are several kinds of messages that can be sent along a bus. They are: request block, request word, word value, invalidate block, invalidate word, acknowledge value, and acknowledge invalidate.

The acknowledgements serve only to guarantee the serializability of writes to memory. Acknowledgements may either be transmitted over the buses used to send addresses and data, or may be carried on separate signal lines. In the worst case, the number of acknowledgements may be quite high, so the latter approach is preferred.

The basic purpose of a cache connected to the system is to conceal the existence of the network from the caches attached to a bus. That is, each cache behaves as if there were only a single bus, except that each cache will pass those requests needed to maintain consistency to the other buses to which it is connected.

More precisely, in this invention, each bus makes use of a variant of a standard snoopy caching protocol. When a CPU tries to read a location or a block, if any other cache on the bus can supply it immediately, the bus is held while all such caches simultaneously supply the value. Otherwise, there will be exactly one cache which connects the bus on which the request was issued to the subtree for the block in question (which defaults to the subtree that contains the main memory module for this block); the request is recursively handled by that cache. A request that reaches main memory is handled by main memory.

On a write step, we first make sure that the cache contains the block by reading it, if necessary. We then issue an invalidate word or an invalidate block, propagating the request as in a read; instead of the answers coming back, however, acknowledgements are returned. At each level, if the operation would be the k'th consecutive invalidate word issued by that cache on a bus with no intervening read requests, we issue an invalidate line instead. The value of k is chosen to be the ratio between the cost of invalidating a word and fetching a block, as measured in bus cycles.

If the tree used to store each block of data is well-defined and memory requests are distributed uniformly, the number of entries needed in each cache to locate the bus that accesses a block is equal to the number of blocks each cache can store times (d-1). A small extra multiplicative factor of the logarithm of that amount is preferred, since "hot spots" will otherwise occur. A similar number of extra blocks must also be available to each cache to hold shared data; the quantity should be proportional to the expected sharing load, as well.

The features and advantages of the present invention will become more apparent from the following detailed description given with reference to the drawings.

DETAILED DESCRIPTION OF A PREFERRED EMBODIMENT

Figure 1A:
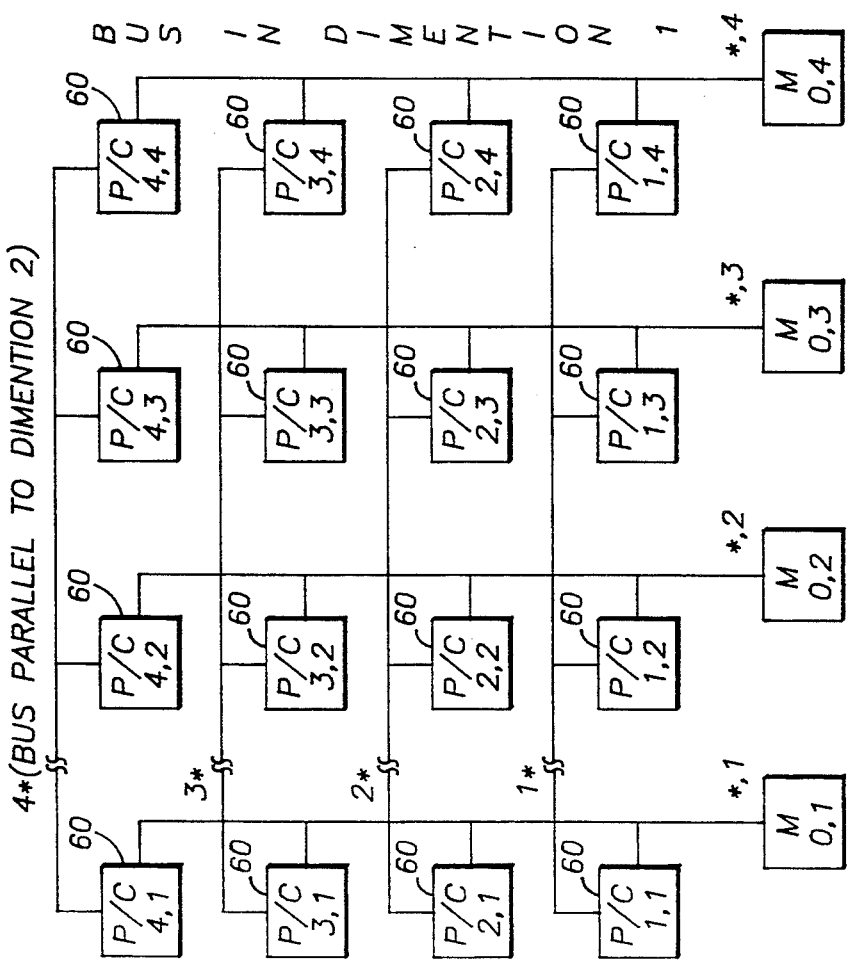
FIG. 1A shows the arrangement for the case of a 2-dimensional 4-cube form of a hypercube.

The simplest known algorithm for competitive snoopy caching in the case of a single bus is also an algorithm that works well in the multibus case. Therefore, the first section presents results on a simple competitive algorithm for a single bus. A proof is presented that the competitive algorithm is, in fact, strongly competitive; that is, the constant factor it achieves relative to optimal is the smallest possible constant for a deterministic algorithm. This algorithm and the proofs are a distillate of the results presented in (Karlin et al., (October 1986) "Competitive snoopy caching," *Proc. 27th Annual IEEE Symposium on Foundations of Computer Science*, Toronto, 224–254).

In the following section, this algorithm is shown to be suitable for use in connecting networks of snoopy caching buses into a tree, and that a hypercube of buses can be used to get low-interference trees, by picking spanning trees based on hashing the block address. This work parallels results in (Karlin et al., supra), extending these results to caches smaller than the virtual address space of the processor.

In the next section, the serialization problem inherent in updating values in any asynchronous network is examined. An update algorithm is presented that preserves serial semantics, and a more efficient one that can be used when serial requirements are relaxed, such as when all accesses to shared memory are monitored by a readers/writer lock. This closes the largest gap in the known previous work.

Finally, the block diagram and flowcharts of an exemplary system, as well as the key instructions to be executed, are discussed in detail.

A Competitive Algorithm for Snoopy Caching

In order to simplify the analysis in this preferred embodiment, our attention is restricted to direct-mapped caches. Assume that the number of bus cycles used to fetch a cache line or to write a dirty cache line back to main memory is k. Let's assume that a message to update the value of a location, or to request all other caches to invalidate a line uses 1 bus cycle. The actual numbers aren't important here, only the ratio. Notation is simplified by assuming that every cache uses the same hash function, although it doesn't change the results. In particular, the assumption then follows that each cache contains just one line, for purposes of counting bus accesses, since there can't be any conflicts for blocks that hash to different lines. The block held in processor i's cache is denoted by b(i). Finally, v(i) and d(i) will be booleans which record if that block is valid, and if the block is dirty, respectively.

This analysis also assumes that the request sequence is fixed; that is, the processors traffic for this line isn't affected by the speed at which the sequence is executed. This is only realistic if the algorithm never delays a processor by very much; on the other hand, once the timing of an algorithm is changed, there's no way to predict how that will change the request sequence without knowing the algorithm, so this seems about as reasonable an assumption as any. Every processor request is either a request to read a location in some block, or a request to write a location in some block. Let r(i,b) denote a request by processor i to read a location in block b, and w(i,b) denote a request by processor i to write a location in block b. A request sequence is a mapping from times to requests. Such sequences s is denoted as having t'th element s[t].

To satisfy a request r(i,b), we must make v[i]=true and b[i]=b. If this is true before the request, the attempt to read can be satisfied directly from the processor's cache. Otherwise, k bus cycles must be expended fetching the block either from main memory or from some cache that contains it. If the block previously held in the cache is dirty, it must also be written back to main memory before discarding it, also at cost k.

To satisfy a request w(i,b), it must first be established that the cache holds block b. Our analysis is simplified by assuming that the request which immediately precedes this is r(i,b). In that case, the next step is either broadcast an update, at cost l, or ensure that the block is held privately by cache i. That is, for no j≠i is it the case that b[j]=b and v[j]=true. This is done either by invalidating the block, at unit cost, or by having held the block privately at some earlier time and not having given it away subsequently. In the case of a private write, it is also necessary to make d[i] true, since the contents of the block as held by cache i will now differ from that held by main memory.

Both exclusive write and pack rat can be described using these operations. In the exclusive-write strategy, an invalidate is issued if the block may be shared. In the pack-rat strategy, an update is issued unless the block isn't shared. The comparison technique used becomes more evident by considering some bad sequences for these two strategies.

To see the flaws in exclusive write, suppose that there are n processors, numbered 1 through n. The sequence of requests used is most simply described as everybody reads, one writes, everybody reads, one writes, . . . Formally, this is s[mn+i]=r(i,b), for all m=0,1, . . . l-1 and i=1,2, . . . , n. We'll also take s[(m+1)n]=w(n,b), for the same range of m. When exclusive write executes this sequence (starting from a state where the block is held in all of the caches), the cost is 1 for invalidates, and (n-1)*(l-1)*k for reading back, for a total of (n-1)*(l-1)*k+1. The optimal strategy just performs all the updates at cost 1. Thus, exclusive write performs worse by a factor of (n-1)*k+1, in the limit.

Considering pack rat, a much shorter bad sequence is found. Suppose a block b starts out in cache 1. The request sequence is s[2m-1]=r(2,b) and s[2m-2]=w(2,b), for m=1, . . . , l. The total cost to execute this sequence is l for pack rat, and 1 for the optimal algorithm. Thus, there is no upper bound on how much worse the performance of pack rat is than optimal.

The algorithm described herein is a balanced combination of pack rat and exclusive write. In striking this balance, a simple improvement to exclusive write called block snooping has been discovered. After a block is invalidated due to writes, the value of b[i] is preserved, and the block is marked as invalid for cache i. If block b[i] is ever broadcast due to a read request by a processor, cache i grabs it as it goes by. This allows read back to take only k bus cycles, no matter how many processors are attached to the bus. Just this simple change improves the worst case ratio of pack rat with block snooping to k+1 (instead of (n-1*k+1).

The next improvement provides a worst case ratio of 2. This is optimal, in the sense of the following theorem.

Theorem. For any deterministic algorithm A for choosing between invalidation and update, and any integer l, there exists some request sequence such that A uses at least 2*l bus cycles to satisfy this sequence, and the sequence can be performed in no more than l bus cycles optimally.

Proof. This example uses two processors 1 and 2, and one block b. Let b start out in both caches. While b is in cache 2, as managed by algorithm A, request r(1,b), and then w(1,b). When b is not in cache 2, as managed by A, request r(2,b). Repeat this until the sequence contains at least l w(1,b)'s or l r(2,b)'s. The cost to algorithm A is at least equal to W, the number of w(1,b)'s, plus k*R, the number of w(2,b)'s, which exceeds l. The optimal strategy is, for each run of w(1,b)'s, to observe how many there are before the next r(2,b). If that number is at least k, then the optimal strategy drops the entry from cache 2 before executing the sequence of w's, and pays k to read b back into cache 2 at the next r(2,b). This costs the optimal algorithm k, while A has spent at least 2*k, since there were at least k w's. If the number of w's is less than k, the optimal algorithm pays 1 for each w, at total cost m, say, while A pays m+k, which is larger than 2*m, since k>m.

The algorithm is quite simple: if a block is written to by the same processor k times in a row, with no other processor reading or writing that block in the meantime, invalidate it in all other caches. Until then, keep it shared. This algorithm is called the limited block snooping algorithm.

This can be implemented quite simply: the last writer to a block keeps a counter of the number of times it has written to the block. Whenever it writes through to a location in the block, it sends with it a bit indicating whether this is the k'th consecutive write. Each other processor keeps track of whether it has read a location in the block since the last time it received an update. Upon receiving an update, any processor which has read it since the last update pulls down a separate return signal on the bus, similar to the standard implementation which tests if the block is still shared. If any cache asserts this signal, the counter is reset to 1, otherwise it is incremented. If the writing cache asserted that this was the k'th write and no cache asserts the signal, all other caches invalidate the cache line.

This algorithm generalizes the one in Rudolph et al. (June 1984) "Dynamic decentralized cache schemes for MIMD parallel processors", *Proc. 11'th Annual IEEE Intntl. Symposium on Computer Architecture,* Ann Arbor, 340–347, by counting to k instead of 2, and by incorporating block snooping.

Theorem. On every sequence of requests, limited block snooping uses at most twice as many bus cycles as are optimal.

Proof. Let w[b] be the number of consecutive writes to block b without any other processor reading, and without a writeback, up to a maximum of k; after a writeback, or when no cache contains b is shared only if w[b]<k. It simplifies the proof to assume that when w[b]<k, all writes are write-through, keeping the block clean; assuming that main memory snoops, a block is dirty if and only if w[b]=k.

Let A be any algorithm for maintaining consistency. Algorithm A could, for instance, be the optimal algorithm for the sequence s under consideration. Let F(t)=sum(w[b], for b which are clean to A after t steps)−sum(w[b], for b which are dirty to A after t steps)+n*k. Then, since A can have at most n blocks dirty at a time (since there are only n lines total in all the caches), and w[b] is always between 0 and k, F(t) is always non-negative. In addition, assuming that the caches start out full of dirty blocks, each of which has w value equal to k, F(0)=0. Without this last assumption, an additive constant of at most 2*n*k is needed to make the theorem true.

Let CLBS(t) denote the number of bus cycles used by limited block snooping to execute the first t steps of s, and CA(t) the number of bus cycles used by A. Induction on t demonstrates that CLBS(t)+F(t) 2*CA(t), for all t. Since F is always non-negative, this proves the theorem, if true. When t=0, it is true, since both sides are 0. Executing a step from s, it is apparent that the change in the left hand side is exceeded by the change in the right hand side. We omit the proof of the inductive step at this point in the extended abstract; it is a simple case analysis, similar to those found in Karlin et al.

Gateways, Trees and Hypercubes

Suppose that a processor is simultaneously connected to several buses. It acts as a gateway between the buses if, when an update or invalidate originates on one bus, the gateway forwards it to all other buses on which the block is present, and if a read request is presented by one bus, the gateway forwards the request and resulting data to some bus on which the block is stored. In this way, the gateway preserves data coherence.

In order to implement this efficiently, make a simplifying restriction. If the gateway doesn't store a block, it cannot be shared across the gateway. This allows the gateway to replace main memory, guaranteeing that updates to dirty blocks are not lost. Since this limits the amount of sharing possible, the assumption that all caches use the same hash function is eliminated. The gateway must also keep an additional directory of blocks stored on exactly one bus; the default location for a block is on the bus where main memory for that block resides. When the gateway takes a collision on the cache line used for storing a block, it makes the block private to the bus on which the last write was seen, or to the bus which associates main memory for that block if this is impossible. When the gateway takes a collision in the directory, it must invalidate the block on the bus storing it, unless that bus is the bus on which main memory resides for that block. The directory information allows locating the bus which contains a block when a read request is observed.

A competitive solution is achieved by taking the limited block snooping algorithm and applying this to the gateway. Assume, for blocks in the cache of the gateway, that the gateway records which of the buses to which it is connected store the block.

When a read request comes in for a block stored on only one bus connected to the gateway, the request is forwarded as if the gateway made the request. When a read request comes in for a block shared across the gateway, the gateway satisfies the request from its own memory, since the block will be clean.

When a write request comes in for a block shared across the gateway, the gateway identifies itself as the writer, and forwards the update to those buses on which the block is stored. Each bus performs invalidation based on the number of consecutive writes it has seen by the same writer. Thus, if two processors on different buses alternately write, the block will not be invalidated on those buses, but will be invalidated after k writes on all other buses.

It is easily seen that, except for the restrictions about collisions at the gateway, the gateway is an ordinary participant in a limited block snoopy caching arrangement on each bus to which it is connected. The only difference is that all operations which take place in any processor other than those connected to the bus appear to originate with the gateway. Most of these requests are, naturally, satisfied locally. Since the restrictions imposed on gateway collisions hold also for any other algorithm, the gateway limited block snoopy caching algorithm again uses no more than twice the optimal number of bus cycles, independently on each bus.

By replacing individual processors on the buses connected to the gateway by gateways, these results can be extended to trees of buses.

In order to achieve greater bandwidth, take an arbitrary network of buses, and use a hash function on the block address to compute a spanning tree for the network, and use that tree for all communication about the block. The main difficulty with this is that updates for different blocks will now propagate at different rates. This raises a problem for serialization addressed in the next section.

A particularly well-suited network of buses is a d-dimensional n-cube. In this configuration, each processor is identified by a d-tuple of integers in the range 1, . . . , n. The buses connect a set of n processors whose identifiers differ in one component; a bus is in dimension i if the processors it connects differ in the i'th coordinate. A bus is identified by its dimension and the fixed coordinates of the processors on it. Thus, in a three-dimensional five-cube, bus (4,*,3) connects processors (4,1,3), (4,2,3), (4,3,3), (4,4,3), and (4,5,3).

The children of a bus in dimension i comprise all the buses in dimension i+1 which intersect it; buses in dimension d have no children. For example, bus (4,*,3) above has children (4,1,*), (4,2,*), (4,3,*), (4,4,*), and (4,5,*). By picking an edge in dimension one as a root, a spanning tree of the cube is produced by taking all descendants of that bus using the above child relation. A main memory module is placed at position 0 on each bus in dimension 1, and a hash function chosen that maps block addresses into the $n^{d-1}$ main memories just defined.

In the typical limiting case for snoopy cache performance, this should afford a speedup on the order of $n^{d-1}$, reflecting the improved bandwidth to main memory. An individual main memory access is slower by a factor of d, however, since it must propagate through that many buses; the throughput is as stated, since these requests can be pipelined.

The overall speedup is not that good; if all operations are write requests to blocks which are globally shared, there will be no effective speedup. Fortunately, this is not a typical reference pattern. Moreover, such a reference pattern cannot be kept up for long, since blocks would be invalidated on most buses after only k references, and k is likely to be much smaller than $n^{d-l}$.

Serialization Issues

One final problem remains: just sending out updates and letting them flow through the spanning tree as quickly as possible does not allow for correctly serialized updates to blocks which use different trees. The key problem is reflected in the following theorem.

Theorem. In any asynchronous network with independent paths for updates to different locations, serialization cannot be obtained unless locations are updated only after all previous copies of this location have been blocked for reading in other caches.

Proof Sketch. Consider two processors, one of which assigns 1 to x, and one of which assigns 1 to y, both of which previously had value 0. Assume that x and y are both valid in several other caches. If one processor observed x changing before y, and another processor observed y changing before x, serialization would be violated. Consider the first cache in which x or y receives the new value. Without loss of generality, suppose it to be x. Then, all updates to y must take place after all updates or invalidations of x, or else some processor could observe a violation of serialization. But the first update to x cannot know of the assignment to y, since it was issued asynchronously by another processor. Thus, the assignment to x must first insure that the value of x cannot be observed while the update traverses the network.

To implement this, a serialized update is performed in three phases. First, add tag bits to the cache line that indicate which locations in the block are suspect. When updating a shared location, first sweep the tree marking the location suspect in all caches that share the block. As this phase completes, it sweeps up the OR of the usage bits, to maintain the value of w[b], and returns that back up the tree. Subsequently, allow caches to issue individual word requests to fetch the contents of the location, and clear the suspect bit. These requests only propagate as high in the tree as necessary, and use a block snooping strategy to avoid multiple reads from the same bus. Thus, the amortized number of bus cycles needed for an update operation is, at most, 4 per bus.

For updates without serialization guarantees such as for monitored variables, a queue is maintained of issued updates for which the OR of bits has not been received. (This is necessary because the system does not assume that all the locations in a block are monitored by the same lock.) When a serialized operation is issued, it is placed in the queue, and its invalidation issued. When a request to read the serialized value is seen, it is delayed until all previous entries in the queue have been confirmed, including the invalidation of the serialized write.

In the foregoing, it is assumed that operations which cannot be performed at that moment are queued; if the are rejected instead, subsequent retransmission will affect the competitive bounds previously described. The details of two invalidation operations being simultaneously issued for the same memory location are also not covered in detail. In that case, the requests will agree on the tree, and at the point that the two operations run into one another, it is assumed that they happened one immediately after the other. Thus, one of the operations succeeds quickly by being overtaken by the other. It is unimportant which update succeeds.

Snoopy cache networks of up to sixty-five thousand ($16^4$) processors are feasible, and can provide a convincing and efficient simulation of a shared-memory multiprocessor.

Limited block snoopy caching is a very promising algorithm even for single-bus systems. Block snooping is an effective way to take advantage of the broadcast capabilities of a bus. Balancing reading with updating avoids the pitfalls of the conventional, more extreme algorithms.

The above description provides the theoretical basis for the development of the present invention. The description to be given below is of an approach to an exemplary embodiment incorporating and utilizing the present invention.

Although this method is not limited to any particular organization of buses, an example network is a d-dimensional n-cube, with buses for edges. That is, the caches have addresses which are d-tuples of integers between 1 and n. The buses have addresses which are d-tuples that have one entry which is a '*' and all other entries which are integers between 1 and n. A bus connects all the caches whose address agrees with the address in all positions other than the one with the '*'. We said that a bus is parallel to dimension i if the i'th entry in its address is the '*'. We place a main memory module at position 0 for every bus parallel to dimension 1. Thus, the address of a memory is a d-tuple of integers, the first of which is a 0, and the remainder of which are between 1 and n. If n is chosen to be a power of two, we can easily define a hash function from block addresses to d-1 tuples of integers between 1 and n, since we can just take any (d-1)* log(n) bits from the address, and permit them into d-1 groups of log(n) bits. Given such a hash function, the main memory module associated with a block is the one whose address is a 0 concatenated with the result of the hash function of the address of the block. We construct a spanning tree for that memory module by including the unique bus parallel to dimension 1 which connects to that memory module, and by taking all buses parallel to dimension i+1 which connect to a processor connected to a bus parallel to dimension i which is already in the tree.

FIG. 1A shows the arrangement for the case of a 2-dimensional 4-cube:

"P/C" denotes a cache and its processing element; "M" denotes a memory unit. All units and buses are labelled; note that bus *,3 connects all the caches and the memory that have a 3 as a second component. All communication for memory locations stored in M(0,3) use only bus (*,3) and the other buses in the spanning tree, (1,*), (2,*), (3,*), and (4,*). Acknowledgement lines are not shown in the diagram, but connect every pair of caches in the same row or column.

In the case of a 3-dimensional 4-cube (partially shown in FIG. 1B), the buses from which we make the spanning tree for a block which hashes to memory (0, 3, 2) are: (*, 3, 2) [in dimension 1]; (1, *, 2), (2, *,2), (3, *, 2), (4, *, 2) [in dimension 2]; and every bus in dimension 3.

Figure 1B:
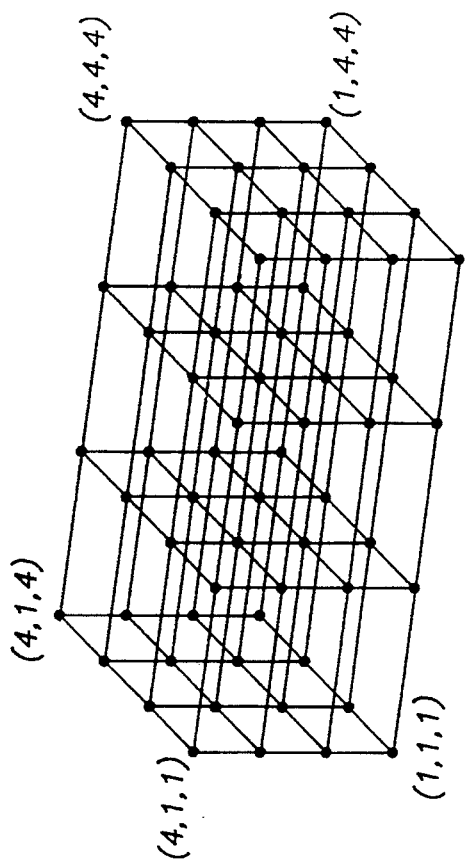
FIGS. 1B and 1C illustrate schematically a 3-dimensional hypercube and a spanning tree defined in such a hypercube.
Figure 1C:
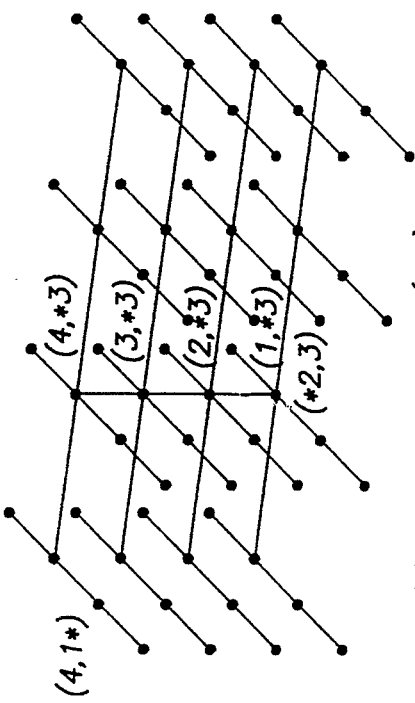

Referring to the spanning tree of FIG. 1C, the bits extracted using a hash function are 2, 3. As explained above, the tree is based on bits one dimension lower than the whole queue. The first bus will be the *23 bus, the vertical bus. Then the four horizontal buses, the 1*3, 2*3, 3*3 and 4*3 will be the dimension 2 buses. And all of the dimension 3 buses will be in spanning tree. The spanning tree includes these because there are no cycles, i.e. there's only one path from any node to any other node, but every node is connected to every other node.

This invention is applicable to networks having the shape of a hypercube. A straight line is a hypercube of dimension 1; a square a hypercube of dimension 2; a hypercube of dimension 3 and so on. Usually a hypercube means that you have only two nodes on each edge. The nodes being labeled as described above. The general formulation for describing the number of nodes which may be incorporated in a hypercube according to this invention as described and shown below is:

$n^d$ caches; $n^k$ locations k d

A d-tuple $(n_1 \ldots n^d)$ represents a processor: it is connected to every $(n_l, \ldots n_l, \ldots n^d)$, each l.

Let the low-order $n^{d-l}$ (i.e. l mod $n^{d-l}$ (i.e. l nod $n^{d-l}$)=$(l_l, \ldots l_{d-l})$ determine the tree for l:

$(l, \ldots l_j, *, n_{j+z}, \ldots n_d)$

Although the example to be discussed below will include many references to the structure shown in FIG. 1, wherein each two nodes are connected by a bus so that the nodes differ in exactly one position in their description, the objective of this invention is to generalize the techniques applied for a single bus and make them work over a network of buses connected into a hypercube of greater dimensions.

Figure 2:
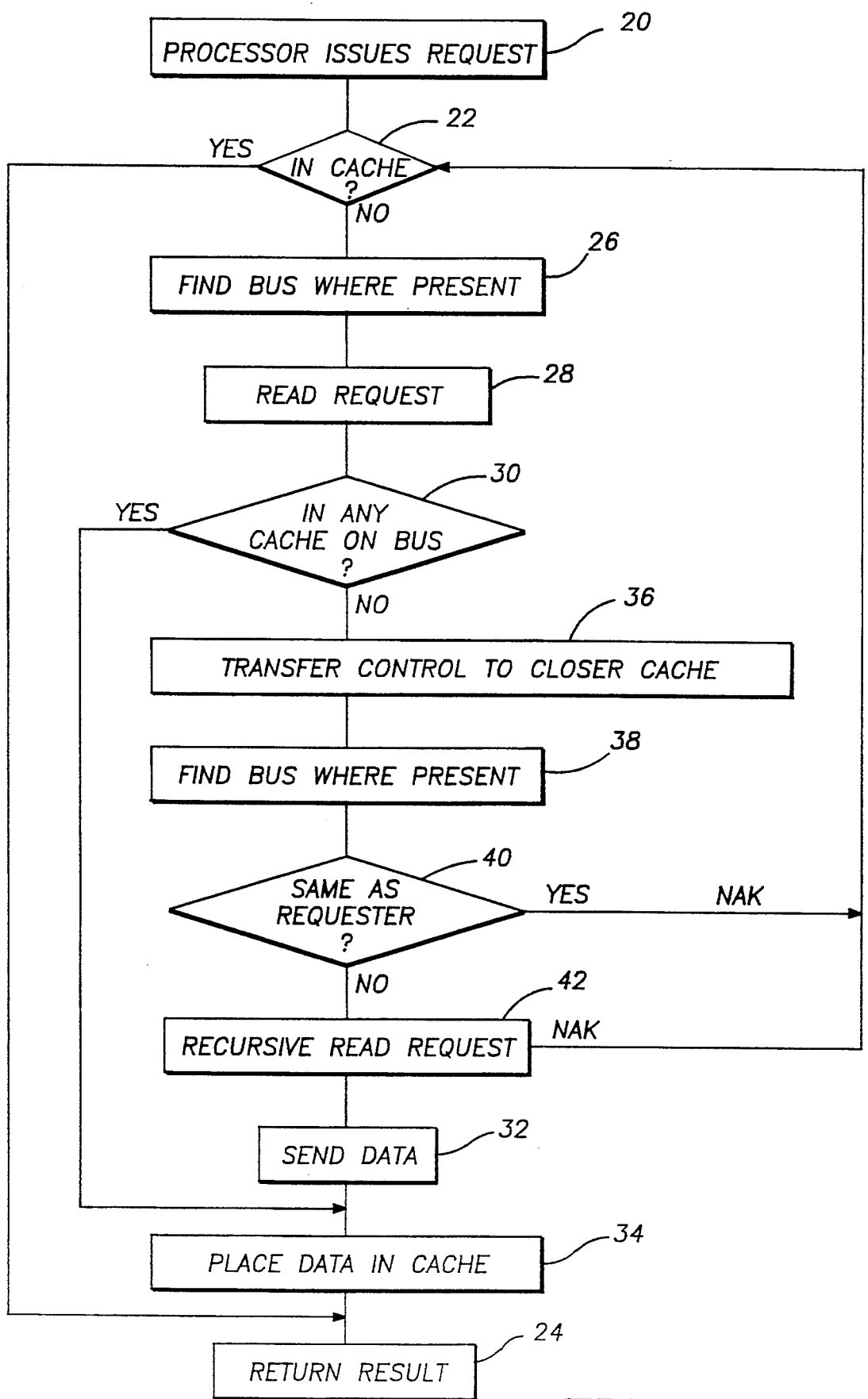
FIGS. 2 and 3 are flowcharts of requests issued by the processor of each gateway of a hypercube.
Figure 3:
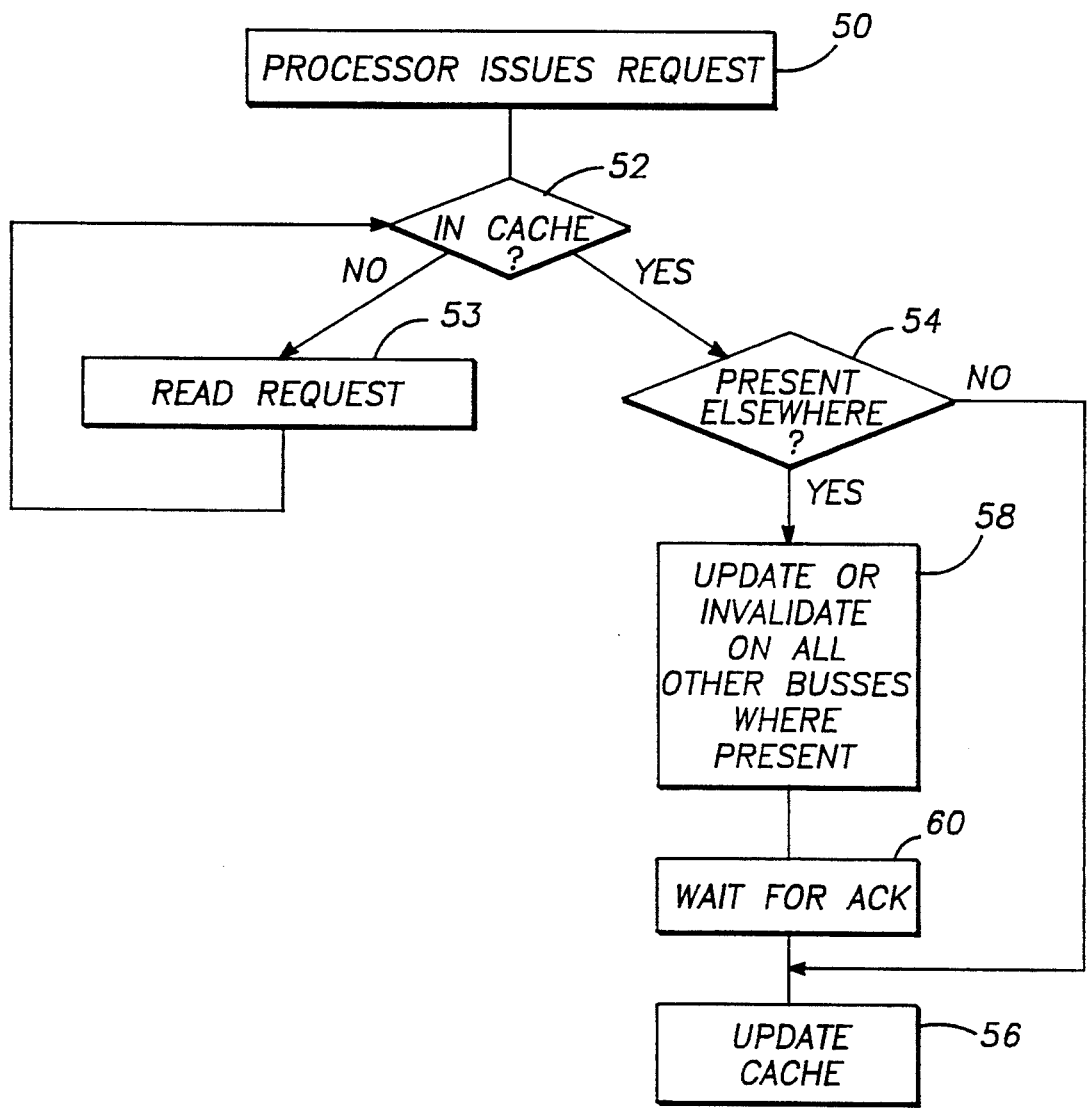

FIGS. 2 and 3 illustrate the process sequence by which the two primary forms of request, a read request (FIG. 2) and a write request (FIG. 3) are handled. When a processor P/C issues a read request 20 (FIG. 2) it first determines if the data is in the cache 22. If yes, then the result is simply returned to the processor 24. If not, then an inquiry is made 26 as to the bus on which the data is present, and a read request 28 is sent. This read request determines 30 if the data is present in any cache along the bus. If yes, the data is returned 32 and placed in the cache 34 of the sending processor so that the result can be returned 24 to the requesting processor. If the data is not present in any cache on the bus, then by passing the request through a gateway which is the junction between any two or more intersecting buses, an inquiry is made 36 for the bus where the data is stored. We issue a read request on that bus. If it is on the same bus as made the request (40, 41), a negative acknowledgement is returned. If not, we do a recursion on the next level bus (returning to read step 28) to attempt to provide the data to the requesting processor.

It should be noted that in each case, filling a cache line may require vacating it first which is done by invalidating in the direction away from main memory.

Referring next to FIG. 3, a write request is processed beginning with the processor issuing a request 50, an inquiry being conducted 52 to determine whether the data is in the cache. If it is not in the cache, then a read request 53 is sent out over the bus in order to determine if it is present elsewhere on any of the buses. If it is present in the cache, then the processor must determine 54 if it is present elsewhere; if not, then the cache is updated at that point 56. If the data is present elsewhere along one of the buses, then an update or invalidate 58 is sent out on all other buses where the data is present and the processor waits 60 for acknowledgements to come back indicating that the update or invalidate has been accomplished. When all the acknowledgements are returned, then the cache is updated 56.

The different requests which may be sent through any gateway generally indicated at 60 on FIG. 1A are as follows:

| | |
|---|---|
| read (l, p) | l address, l block address, p processor id, |
| data (l, p, d) | d data |
| update (l, p, d) | invalidate (l, p)All address are real |

At any point one of the requests may be received at the gateway on one of the buses. When a read request is received at the gateway, which includes its own processor and other structure as will be discussed below with respect to FIG. 4, this read request means that some processor along the bus wants the identified piece of data. The gateway either supplies the data if it has it, or finds it by sending a read request out on one of the other buses to get it. When the data is received back at the gateway, it is forwarded back to the sending processor.

The data request means that some other processor is sending back to the gateway the results of a read, or else is trying to pass on a piece of data.

The update request means that another processor is changing a value of a particular line of data and according to the rules of the process, it must inform every other processor having a cache storing the data what the new values in that line of data are.

Invalidate means that a processor is telling all other processors having a cache storing the data not to store that piece of data any further.

Figure 4:
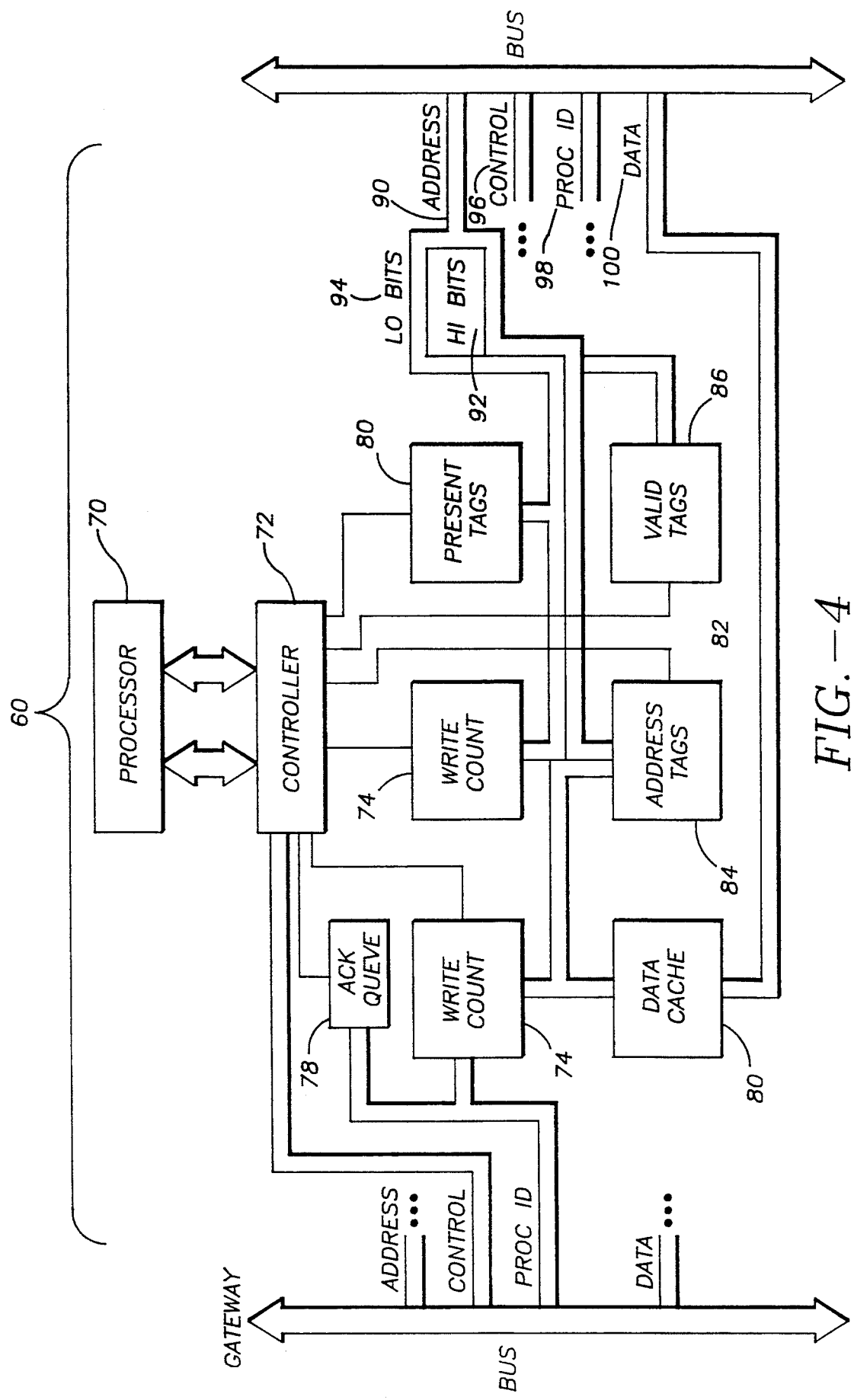
FIG. 4 is a block diagram of a gateway controller.

Referring next to FIG. 4, this constitutes a block diagram of the structure of each gateway controller. It may be connected between two or more buses as was described above, with the connections shown simply being replicated for each additional bus that is connected to the gateway. The gateway includes a processor 70 and controller 72, a write count store 74, 76 for each connected bus, an acknowledge queue 78 for keeping track of acknowledgements as is required in carrying out a write request (FIG. 3, 60), a data cache 80 for storing the lines of data which are presently stored at each gateway, and a tag memory 82 comprising stores for address tags 84, valid tags 86, and present tags 88.

Each word arriving on any bus at the gateway comprises an address 90 having high bits 92 and low bits 94, control bits 96, a processor ID 98, and data bits 100. The address bits 90 are directed to the tag memory 82; the data bits 100 are stored in the data cache if they comprise a line of data which is to be stored at that gateway; the control bits direct the operation of the controller 72 and processor 70 in accordance with the particular request being transmitted in that word, and the process ID bits 98 are stored in the acknowledge queue 78 and the appropriate write counter connected to the particular bus.

In summary, the information coming off the bus informs the gateway what the type of request is, who is asking for it, what the processor is asking for, and what the values are. The processor ID 98 identifies the requesting or sending processor. As to the address bits, the low bits 94 are used as an index into the cache, and the higher bits 92 are stored to keep track of what is actually stored in the cache. As to the tags, the address tag 84 is telling the controller 72 what data is really present in the cache; the valid tag 86 indicates to the processor whether the data is trustworthy or valid; and the present tag 88 tells us which of the buses that the gateway is connected to share that particular line of data, that is where else that line of data is stored. It is the use of these tags that allows the gateway to either respond to any request itself, or forward the request along some unique path to where it is actually stored.

It should additionally be noted, that every piece of data received on a bus, in the address portion, incorporates a home location which is determined based only on the address. For this reason, based on this transmitted home location which as can be seen is incorporated both in the data cache and into the tag store, if a gateway does not know where to look for a particular piece of data, it assumes that the data is in the direction of that home address.

In summary, the address tags 84 tell us for each of the lines in the data cache what data is actually stored in that line; the valid tags 86 tell us whether or not the data is trustworthy, and the present tags tell us where else the data may be located. The present tags modify the home address information in the sense that although every piece of data has a home address, the present tag may tell us that the data's present value is no longer stored at that home address.

The write counter 0, 74 tell us for each given block how many times it has been written to by bus 0, whereas write count 1 tells us how many times a particular block of data has been written from bus 1 (and data is always transferred in blocks, rather than line by line on the assumption that if one line of data is being used by a given processor, then the remainder of the adjacent block will also be used by the same processor). When a write count reaches a certain level, establishing that that particular value has been written to a particular number of times either by the bus connected to its associated write counter 74 or by the local processor 70, that it is time to invalidate that data.

The other necessary part of the gateway is the acknowledge queue 78 which makes sure that the operations happen in the correct order. For example, when a processor makes a request, the request is not finished until it gets an acknowledgement. For example, in making a write, it is necessary as shown in FIG. 3 to update or invalidate (58, 60) every other cache where the data is present and wait at the sending gateway for acknowledgements to come back indicating that all these updates or invalidates have been accomplished. If there are several buses involved, then there may be a acknowledge cue 78 of considerable length waiting before it is established that the processor can complete the updating of the line in the cache.

Returning to FIGS. 1A-1C, what happens in the operation of the system is that a processor at any one of the indicated sites tries to read or write a location in its own cache memory. It issues that request and the cache must deal with it which is straightforward if it is a read request and the data is in the cache or it is a write request and the data is in the cache and wasn't shared. If it turns out that the data is not in the cache, then the processor must communicate over the bus of the hypercube structure using the read, data, update and invalidate requests. The information that each gateway is maintaining, or status of each gateway may be expressed as follows:

For each block and each bus, a bit that records
Present $(l, b, P)$ true if $\exists$ p such that the path from p' to p for l uses bus b, and Cached $(l, p)$
Cached $(\bar{l}, p)$ true if cache contains block $\bar{l}$ Data $(\bar{l}, p)$ if $\bar{l}$ cached by p, the data associated with it
Last writer $(\bar{l}, p)$ the processor directly connected to p which issued the last update, valid if cached
Write count $(\bar{l}, p)$, number of consecutive writes by last writer, valid if cached.

The basic rule which is to be followed in defining the present system is that each piece of data that we seek to read or write is present in one of the caches which can be reached along a single unique set of buses that make a tree connected to any given gateway, there only being a single unique path from the gateway down through the tree to the cache and the memory location where the data is stored. We will next consider the four possible responses to the requests listed above.

Response to read $(\bar{l}, p)$ at Po
If cached, $(l, po)$, evaluate Data $(l, po)$, and start sending data, $(l, p, d)$ for each $(l, d)$ $\bar{l} \times D$
Else $\exists$ b sit. Present $(\bar{l}, b, po)$. Send read $(l, p)$ to that bus.

This means that if a given gateway sees a read request, we check to see if it is cached or valid at the gateway. If so, we look up the data and start sending out a data request and sending it back to the processor that requested it. If it is not cached, then we know there is going to be exactly one bus connected to the gateway along which or Reading to where the data is present, because that is one of the invariants the system maintains is that if the gateway does not have the data, it can only be in one direction. Finally, if the gateway has not stored data telling it where the requested line of data is to be found, then it has to be in the direction of home.

A second possibility is a response to an update as follows:

Response to update $(l, p, d)$ at po.
If cached $(l, po)$, update Data and:
Let p', b' be the (processor, bus) directly connected to po that represents p for l. If p'=LastWriter $(l, po)$ increment WriteCount
If WriteCount=K, invalidate line, and forward invalidation to other buses, clearing Present. Otherwise, assert the shared bus line back to the sender.

Relating this to FIGS. 1A-1C, suppose that the tree for this particular piece of data was the * 2 bus and the horizontal buses to which it is connected, and suppose that the request happens at processor 34, and the data is shared at some place. Since the data is shared and a write request is being performed, an update is sent along bus 3 * because that is the one that is part of the tree that the data rests on. When the request reaches the gateway at 32, that is the one on the * 2 bus which is a part of the tree for that piece of data or line of data. The gateway will check to see if the data was present on this bus, that is any place other than the four processors connected to the 3 * bus. If it is not, then the update is finished except for invalidating it at the gateway. If it is present elsewhere, then the gateway will issue an update request along * 2 bus because that is the other bus to which it is connected. Now the processors at 42, 22, and 12 and main memory will take the updated value and change the value because they see the update. They will also look at the update request and see whether it is shared along their horizontal buses to which each of these gateways is connected, and if so, they will send the update along that horizontal bus.

Alternatively, any of these gateways 60 identified as 42, 22 or 12 could decide to send an invalidate. As an example of the reason that this would happen, suppose that processor 13 happens to have the data in its cache, and that processors 24 and 34 are writing to that line of data over and over again. As either of the processors 24, 34, do their writing, the * 2 bus will be where the update message comes in, and the last writer will always seem to be the same, as the update message is always coming in on the same bus. Therefore, the write counter in the gateway associated with the * 2 bus will reach its value K, and then send an invalidate on the bus to which it is connected instead of doing it an update. An update reads as follows:

Response to invalidate (l, p) at po.
Uncache, and forward uncaching

For an invalidate request coming in from a given bus, it is forwarded out over all the other buses on which the line of data is present. So if for example, with the latest update from processor 34, gateway 32 concluded that it was time to invalidate, this would be sent out on the bus, gateways 12, 22 and 42 would pick up the invalidate and send it horizontally out to each processor where the data was present.

The final possibility is the data request, which is the data coming back.

Response to data (l, p, d) at po sent on bus b
If the path from po to p inclues b, then this is just a case of overhearing.
If there is already room for block $\bar{l}$, mark $\bar{l}$ cached, and store the data, marking present only on bus b. Otherwise, ignore this.
If the path does not include b, this is the response.
  Cache the data, and forward it in the direction of p, marking it present on both buses.

What occurs here is that the data is put in the cache at the gateway by the processor, marked as present on both the bus where it was from and the other bus of that gateway, and sent out along the bus which originated the request. The other processors along the same bus * 2, that is processors 12, 22 and 42 also have the chance to observe the data and may cache it if they choose at that point. Typically, one of the other gateways would pick up the line of data if it had been previously invalidated because of excessive writes; then that processor at that gateway would pick up that line of data and store it in its own memory.

What is explained above, works successfully if there is only one request happening at a time for even a hypercube structure. But it does not cover the possibilities of what is to happen when a processor has a piece of data that it does not want any more because it wants something else in the same spot (which we shall refer to as writeback); it does not tell you what to do when there are multiple updates to the same location (called update-update); it does not cover the possibility of what to do if an update is coming from one direction at a gateway and an invalidate comes from another direction (update-invalidate); nor does it cover how to guarantee that when you send two requests to write something that everybody else sees that they happen in the same order that you sent them (self-serialization). It is the successful resolution of these issues as outlined below that allows execution of this method in a hypercube structure.

The limitations on cache memory are easily solved by using the writeback step. Specifically, each datum is assigned a default home. Therefore, when no other information about the location of a piece of data is available at the gateway, the gateway assumes that it is present, and in the direction of the default home.

That is, each gateway knows for each data block where the default home is, because each gateway knows its own address and the address of the default home of the piece of data.

Secondly, a victim write operation is incorporated, which is initiated when Last Writer=self, and the gateway must discard the line of data or data block because of space requirements. Then the gateway sends the block along the tree path to its home so that the most recent value and most accurate value of the data is stored in main memory. It should be noted that when discarding a block that is marked Present on two different buses, it must be invalidated in directions away from the last writer, except where restrictions on Present bits force invalidation away from the home of the data block. For this reason, it is better to have more cache lines for storing Present than for storing lines of data.

As to the update-update problem, the rule adopted is to kill one update and continue propagating the other. If two processors are writing to a location, which one is selected to be propagated or stored does not matter as long as one value is picked consistently.

As to the problem of update-invalidate, the update has to survive and cannot be lost. So the gateway adds to an update a bit that essentially says, "Do an invalidate instead of the update on this request." The result is adding an invalidate when the acknowledgements come back. (The acknowledgement from each bus participant indicates that the operation is done, the data is present, and the gateway then determines whether to zero the write count because the data has been read since last written, as explained below.)

Finally, the problem of serializability mandates the use of acknowledgements which includes incorporating an acknowledgement bus which carries the serial numbers to tell each gateway whether things are shared, and also requires maintaining in the gateway the list of requests that haven't yet been acknowledged, a list which is maintained in the acknowledge queue 78 (FIG. 4). The importance of serializability requires that we let the processor at each gateway demand acknowledgement of all previous writes for continuing with the next write command. This is necessary to make sure that where writes are being made to two different locations, that no other cache sees the value of the second location change until after the first location has changed. Otherwise, it is possible that a processor on another tree could read the second block of data and see the new value, and then read the first block of data and see the old value. Thus, for each update for the first value, a process must be established for waiting until it is actually finished propagating before continuing with the update of the second value. The following describes the way of defining a tree in any hypercube of buses, given the information that the bus carries, the acknowledge information, then the path from one gateway to another on the tree for a given line of data is as follows.

Full Scheme

Built from hypercube of buses; each node is a d-bus gateway; each pair of nodes on a single bus also have an acknowledgement connection.

| Bus carries: | |
|---|---|
| request type | |
| address | lines |
| data | |
| Serial No. | (extra state: a buffer of |
| Acknowledgement Carries: | unacknowledged requests; |
| serial no. | with short ID's assigned |
| shared bit | from position in buffer; |
| used bit | flow control to prevent |
| | overrun; no flow control |
| | for victim-write, since no |
| | acknowledgement needed) |
| | fail on update, causes |
| | retry |

The hash function is irrelevant; for purposes of use, we need to be able to compute only which bus connects two adjacent processors, and what bus is next on the path connecting processor a to processor b, and what block an address of one. For purposes of illustration, assume addresses are of the form $n^{d-l} \times A \times B$. $n^{d-l} \times A$ is the set of block addresses. If processor a has as its address the d-tuple $(a_l, \sim, a_d)$. And similarly for b, and we are considering a block $(1_l, \sim, 1_{d-l}) \times a$, a and b are adjacent if they differ on exactly one place, say $a_k \neq b_k$, and V-i<k, $a_i = 1_i$. Then the bus that connects them is the $l_i, \sim, l_{k-l},*, a_{k+l}, \sim, a_d$) bus.

| | |
|---|---|
| $a_1, \ldots a_d$ | Given A, b next point from |
| $1_1, a_2 \ldots, a_d$ | a to b is: |
| 1hd $1 \ldots 1_k, a_k + 1\ a_d$ | Let k be greatest difference |
| | point between a and b (i.e. $a_n$ |
| | $= b_n, n > k$) |
| $1_1, \ldots, 1_{kl}$ | If $\exists$ i s.t. $a_i \neq 1_i, i < k$, the |
| bk + i $b_d$ | let i be least such; next node |
| $1_1, b_2, \ldots, b_d$ | is $1_1, \ldots, 1_i, a_i +1, n, a_d$. |
| | If $a_1, \ldots, a_{k-1} = 1_1, \ldots, 1_{k-1}$, |
| | next node is $1_1, \ldots, 1_{k-1} b_k - b_d$. |

The following represents the computation of the location where data is found; based on the values in the tag stores 84, 86, 88 (FIG. 4) the processor 70 checks to see if the value that's stored in the address tag 84 for that block is equal to 1. If so, then the value of where it's present is exactly where the present tag says that it is, and otherwise it's in the direction of the home address of that data. Present tells the gateway whether the data is present in the subtree in that direction; cached means here at this gateway; and bus request is the bus on which the request arrived. The gateway assumes that bus 0 is always the bus in the direction of memory. That's going to change for any given location that's requested, based on what the shape of the tree is for that location, but it can be assumed that it's always called bus 0, because the sequence operation starts from a given location.

These rules may be expressed as follows:
Cached (1)—addr=1 $\wedge$ valid
Present (1)—if addr=1 then present else {0}
Bus (req)—the bus on which req arrived at p; if came from local processor, $\infty$.

Invariants

Distinguished bus 0, the bus in the direction of memory.
b$\in$ Present (1)$\leftarrow$ $\exists$ p' connected by bus b to p caching 1
0$\in$ Present (1)$\rightarrow\leftarrow$ $\exists$ p' connected by bus 0 to p caching 1
b$\in$ Present (1) $\wedge$ b'$\in$ Present (1')$\rightarrow$cached.

The following further invariants also apply to the system described herein. First, the cube can be viewed as a set of trees which happen to share physical links, but which form completely disjoint caching domains. That is, the address information carried on the bus with respect to any cache line can be used by the gateway to figure out exactly which tree is connected to all other caches storing that data. Each cache line can have a uniquely-defined tree or set of trees. Therefore, it is unnecessary at any time to completely analyze the entire hypercube, but just consider the tree associated with the particular cache line and the request being carried out.

Next, on receipt of a read request at a gateway, it can either be satisfied from the gateway's own cache, or forwarded in a unique direction, knowing that it will be handled in that direction. However, it is possible because of the update-invalidate conflict discussed above, that an invalidate is coming at that time, in which case, some other gateway will send back an acknowledgement that is a negative acknowledgement (nak) saying that that gateway didn't have the data because it was being invalidated, and to try that operation again.

This is facilitated by the acknowledge queue, which for updates and invalidate requests, keeps track of what the gateway has sent, and how many acknowledgements have been received, and how many are still needed in order to complete the request. Therefore, this next invariant states that for each requested updated/invalidate, there is, for each bus an indicator at the gateway of whether the gateway is still trying to send the update or invalidate, and a counter of how many acknowledgements are needed back from that bus to complete that operation. When the countdown is complete of the number of acknowledgements needed back at the gateway to complete the operation on that bus, then an acknowledgement can be sent by the gateway back to the requesting processor.

The next invariant is that to avoid thrashing, read requests are suspended while a previous read is in progress. This means that if the gateway has already issued a read request for the same block, it will not issue a further request for that block, because the gateway knows that the data is coming back and can be used to satisfy both requests.

The following is the order of priority in which a gateway handles requests: First negative acknowledgements (nak); then acknowledgements (ack); then data; then invalidate; then updates; then reads.

The following is the response of a given controller to receiving each of these things. On receipt of an acknowledgement, the acknowledgement is recorded by decrementing the counter 74 for the request that was acknowledged. If it is now completely acknowledged, then an acknowledgement is scheduled to be sent back to the requestor. The block is removed from the queue when the transmission is complete.

On receipt of data at a gateway, if the block matches something that that cache is storing, then the processor 72 will store it in its memory 80. Otherwise, the processor forwards that block toward main memory as shown in FIG. 1. If the block is a match and is being stored, and the gateway processor 70 has just gotten the last word of the block from the sending gateway processor, then the block being complete it is marked valid in the valid tag store 86. If a read was pending at the gateway for the data, then the processor sends the block down the bus toward the requesting processor. Finally, if the gateway has a read pending and hears on the bus another processor, answer the request, then the read is killed rather than forward the data, even though the block may be complete in that cache.

On receipt of a negative acknowledgement (nak), we unblock the read that was negatively acknowledged so that it can be tried again, resending it over the bus over which it was previously sent, and marking it not present in the sending gateway.

On receipt of an invalidate, if the data is not cached in the receiving gateway, it is acknowledged right away. Otherwise, we put the invalidate in the acknowledgement queue, since the gateway now must ask every bus that we think is caching the block and transmit the invalidate on all buses on which the data is present, except the bus in the direction of the sender. When all these invalidate are fully acknowledged, then we invalidate the block in the gateway itself and send the acknowledgement back to the requester. It is important to remember to let any pending read go first before the invalidate.

On receipt of an update, if it is not in the gateway's cache, it can be acknowledged immediately except that if the processor issues an update, and it's not in the cache of that processor, then it must first do a read. Once the data is cached, a local update can be done. This is to take care of the special case which makes sure that when the processor is trying to write data the data does not get lost.

Once the update is done, the write count can be adjusted in the write counters 74 maintained at each gateway. Write count (bus(p)):=0; b≠bus (p): write count (b):=max (k, write count (b)+1). For each bus b with a write count that Just reached k and present, issue an invalidate; issue an update on all buses except bus (p) such that present and not invalidating. When all acknowledgements are received, acknowledge. If holding another update, kill it and acknowledge it when this one completes.

The above may be summarized as stating that the write count of the bus that just did the write goes to 0 because it did the write; for all other buses, the write counters are incremented by 1 up to their maximum level of k. If the counter for a bus reaches the value of k, and the value was present on that bus, it is invalidated along that bus. For all other buses on which the data is present, an update is issued. Finally, when all the acknowledges from the updates and invalidates have been received at the gateway, an acknowledgement is sent back to the writing processor. However, if you were holding another update, that is if the gateway was another update pending when it received a request to update the same location, then that update is killed off and this more recent update is done instead, and acknowledged that when this more recent update is completed.

Finally, on receipt of a read, if it negatively acknowledged (nak) during the entire processor, that nak is returned to the sender unless you are at a boundary, in which case the request is retried. If the data is only present in the direction of sender and not cached, then an nak is not asserted; otherwise, a negative acknowledgement is asserted. If all processors on the bus think that the data is present in the direction of the gateway now receiving the read, then this will cause a negative acknowledgement. If cached, the gateway sends back data. Else the data must be present on exactly one bus; if none, the gate sends nak. It repeats invalidate of current occupier of line until line vacant; then issues a read. When the data is read, the gateway starts shipping. Invalidation here means first adding main memory to present by writeback if needed, and invalidating in the other direction.

The above is a description of all of the necessary commands and structure that are necessary to implement the present invention. Alternatives to the present invention may become apparent to a person of skill in the art who studies the present invention disclosure. Therefore, the scope of invention should be limited only by the following claims.

What is claimed is:

1. A multiprocessor computer system including cache memories for processor access to data storage, comprising:

m-dimensional buses, each bus bearing an identifying index, each said identifying index being a bus m-tuple containing an ordered list of integers of which exactly one integer is zero;

a plurality of units bearing m index numbers for identification, each said m index numbers forming a unit m-tuple containing an ordered list of integers all of which integers are non-zero, each said unit including a processor and associated cache memory for storing data, each said processor being able to assert read and write requests for data stored in any said cache memory in any said unit; and a plurality of gateway means, each said gateway means;

(i) coupled to an intersection of said m-dimensional buses for facilitating retrieval of data stored in a said associated cache memory upon request of a said processor associated with a said gateway means and said cache in a said unit, said m-dimensional buses meeting at said intersection being those buses whose said bus m-tuple is identical to said unit m-tuple after replacing an integer in the said unit m-tuple with integer zero, (ii) including queuing means for synchronizing requests from said processors, (iii) including coupling means for enabling each said processor to be coupled simultaneously to each other said processor in said system providing that processors so coupled are associated with gateway means coupled to a same said m-dimensional bus, (iv) including means for governing read and write requests from a said processor, said means for governing performing the following functions in cooperation with a said processor in a said unit asserting a request:

(a) if requested data is within said unit asserting a request, the request is deemed satisfied, (b) if requested data is not within said unit asserting a request, said unit asserting a request is selectively coupled by said gateway means to all other said units bearing at least one index identical to an index of said requesting unit, (c) if step (b) results in said unit asserting a request being coupled by a said gateway to a said unit whose associated said cache memory includes the requested data, the request is deemed satisfied, (d) the requested data is added to said associated cache of said unit asserting a request upon the request satisfaction, and (e) if step (b) does not result in said unit asserting a request initially being coupled by a said gateway means to a said unit whose associated said cache memory includes the requested data, at least one said unit selectively coupled in step (b) re-asserts said request upon behalf of said unit asserting said request initially whereupon steps (b), (c), (d) and (e) are repeated until the request so re-asserted is deemed satisfied, and (f) the requested data is added to said associated caches of said units re-asserting the request in accordance with step (e) and to said associated cache of said unit asserting the request initially upon the request satisfaction.

2. The system of claim 1, wherein said gateway means further includes storage means for recording which of said m-dimensional buses coupled to said gateway means is coupled to a said unit whose said cache memory stores requested data.

3. The system of claim 1, wherein each stored data has an associated home address whereat a current value of said data may be stored.

4. A method of operating a multiprocessor computer system including cache memories for processor access to data storage and wherein said multiprocessor computer system includes: m-dimensional buses, each bus bearing an identifying index, each said identifying index being a bus m-tuple containing an ordered list of integers of which exactly one integer is zero, a plurality of units bearing m index numbers for identification, each said m index numbers forming a unit m-tuple containing an ordered list of integers all of which integers are non-zero, each said unit including a processor and associated cache memory for storing data, each said processor being able to assert read and write requests for data stored in any said cache memory in any said unit, a plurality of gateway means, each said gateway means coupled to an intersection of said m-dimensional buses for facilitating retrieval of data stored in a said associated cache memory upon request of a said processor associated with a said gateway means and said cache in a said unit, said m-dimensional buses meeting at said intersection being those buses whose said bus m-tuple is identical to said unit m-tuple after replacing an integer in the said unit m-tuple with integer zero, said gateway means including queuing means for synchronizing requests from said processors, said gateway means further including coupling means for enabling each said processor to be coupled simultaneously to each other said processor in said system providing that processors so coupled are associated with gateway means coupled to a same said m-dimensional bus, comprising the steps of:

(a) deeming the request satisfied if requested data is within said unit asserting a request;

(b) selectively coupling said unit asserting a request to all other said units bearing at least one index identical to an index of said requesting unit if requested data is not within said unit asserting a request;

(c) deeming the request satisfied if step (b) results in said unit asserting a request being coupled by a said gateway to a said unit whose associated said cache memory includes the requested data;

(d) adding the requested data to said associated cache of said unit asserting a request upon the request satisfaction; and (e) repeating steps (b), (c), (d), and (e) if step (b) does not result in said unit asserting a request initially being coupled by a said gateway means to a said unit whose associated said cache memory includes the requested data, at least one said unit selectively coupled in step (b) re-asserts said request upon behalf of said unit asserting said request initially until the request so re-asserted is deemed satisfied and (f) adding the requested data to the associated caches of the re-asserting units in accordance with step (e) and to said associated cache of said unit asserting the request initially upon the request satisfaction.

5. The method of claim 4, further including the step of associating for each said stored data a home address whereat a current value of said data may be stored.

6. The method of claim 4, including a further step of providing storage means for recording which of said m-dimensional buses coupled to said gateway means is coupled to a said unit whose said cache memory stores requested data.

* * * * *